United States Patent [19]

Spitza

[11] 4,456,997
[45] Jun. 26, 1984

[54] FACILITY FOR FAIL-SAFE DATA TRANSMISSION BETWEEN TRACKSIDE EQUIPMENT OF A GUIDEWAY AND VEHICLES MOVING THEREALONG

[75] Inventor: Dieter Spitza, Gerlingen, Fed. Rep. of Germany

[73] Assignee: International Standard Electric Corporation, New York, N.Y.

[21] Appl. No.: 301,670

[22] Filed: Sep. 14, 1981

[30] Foreign Application Priority Data

Oct. 24, 1980 [DE] Fed. Rep. of Germany ....... 3040080

[51] Int. Cl.³ .................. G06F 11/16; H04L 1/22
[52] U.S. Cl. ...................... 371/68; 246/28 F
[58] Field of Search ............ 371/68, 53, 37, 38; 246/28 F

[56] References Cited

U.S. PATENT DOCUMENTS

| | | | |
|---|---|---|---|
| 3,794,834 | 2/1974 | Auer, Jr. et al. | 371/68 X |
| 3,992,698 | 11/1976 | Sahasrabudhe et al. | 371/68 X |
| 4,209,828 | 6/1980 | Anderson et al. | 371/68 X |
| 4,349,170 | 9/1982 | Bilet et al. | 246/28 F X |

*Primary Examiner*—David H. Malzahn
*Attorney, Agent, or Firm*—John T. O'Halloran; Alfred C. Hill

[57] ABSTRACT

A facility for fail-safe data transmission between trackside equipment of a guideway and vehicles moving therealong is disclosed which transmits two identical data records held in two independent storage arrangements in the trackside equipment to a data receiver in the vehicle according to fail-safe principles. Error protection of the data is provided by means of a cyclic code. To enable monitoring the transmitting equipment for component failures from the receiving equipment, a special bit group is transmitted whose bits are checked for equivalence in the receiving equipment.

5 Claims, 1 Drawing Figure

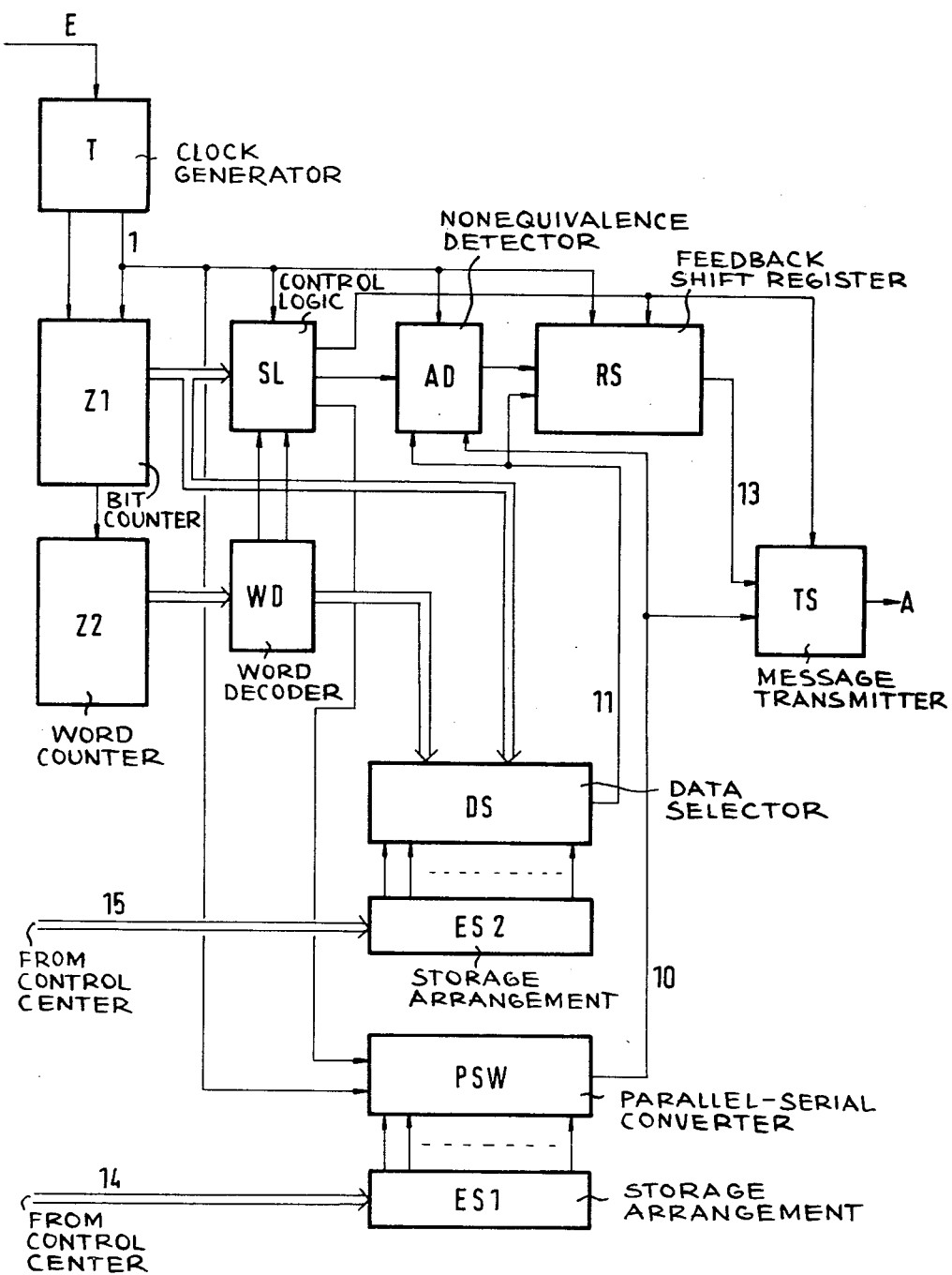

FACILITY FOR FAIL-SAFE DATA TRANSMISSION BETWEEN TRACKSIDE EQUIPMENT OF A GUIDEWAY AND VEHICLES MOVING THEREALONG

BACKGROUND OF THE INVENTION

The present invention relates to an automatic train control system of the type disclosed in U.S. Pat. No. 4,023,753, whose disclosure is incorporated herein by reference, and more particularly to a facility for fail-safe data transmission between trackside equipment of a guideway and vehicles moving therealong.

Facilities of this kind are used, for example, to control trains on lines equipped with continuous track conductors. The rules to be observed in such train control systems, including those concerning the cyclic code to be used to protect the data transmission, are contained in the specification on the result No. 6A of the work of the Committee A46 of the Office for Research and Experimentation, ORE, of the International Union of Railways, UIC (see page 17, item 7, for example), and thus are known to those skilled in the art.

In continuous automatic train control, all vehicles located within a relatively long section of line are controlled from a center. The data transmission takes place in both directions via a permanent connection. If a transmitter or a receiver fails, this will be detected immediately by the nonappearance of given data messages or of information contained therein, and communicated to the respective counter station, i.e., the center or the vehicle.

Since the equipment of a line with continuous track conductors is very expensive, it is only suitable for specially improved, high-speed main lines for the time being.

On other lines, data transmission takes place only at discrete points and to a limited extent (intermittent type of control system), e.g., to transmit signal aspects in the inductive signaling system (Indusi), or in car-number indentification systems (cf. article by H. Gotz, "Systeme zum automatischen Lesen von Eisenbahnwagennummern", Siemens-Zeitschrift 43 (1969), No. 7). It would be desirable if additional information, such as track gradients, distances to signals, and maximum safe speeds, i.e., information which could be stored locally at the trackside and would require no expensive daata link to a center, could be communicated to the vehicles by means of intermittent transmission facilities.

However, this presents the problems of protecting the data to be transmitted and, in the absence of a permanent connection, of detecting failures in the equipment arranged along the track at irregular intervals.

SUMMARY OF THE INVENTION

An object of the present invention is to provide an intermittent data transmission facility which permits information stored therein to be transmitted on fail-safe principles and the transmitting portion to be monitored from the receiving portion.

A feature of the present invention is the provision of a facility for fail-safe data transmission between trackside equipment of a guideway and vehicles moving along the guideway comprising: data transmitting equipment in the trackside equipment to transmit data to the vehicle in the form of serial bit data messages protected against errors by means of cyclic code using a redundancy technique, the transmitting equipment including two independent storage arrangements each having identical data stored therein; a message transmitter to transmit data to the vehicle; a first parallel-serial converter coupling one of the two storage arrangements to the message transmitter; a second parallel-serial converter coupled to the other of the two storage arrangements; a feedback shift register coupled between the second parallel-serial converter and the message transmitter; and means coupled to the first converter and the shift register to time the delivery of data to the message transmitter from the first converter and the shift register to provide a data message for transmission to the vehicle having an information portion provided by the first converter and a redundant portion provided by the shift register.

The facility according to the present invention can be used at any trackside point, independently of any link to a control center. The transmitting antenna may be an induction loop or a track magnet, for example. The monitoring of the transmitted data for transmission errors and of the transmitting portion of the facility for component failures is done at the receiving end by evaluating the received data messages. Since the information part and the redundant part of each data message are created separately, and the data required to form a message are stored twice and independently of each other, it is ensured that any error is detected during evaluation in the receiver, and that no use will be made of the transmitted information in the event of an error. To be able to also detect failures of complete trackside equipments, the distance to the next trackside equipment may be transmitted to the vehicle in the known manner. Then a distance meter on the vehicle monitors whether signals from the next trackside equipment are received after the specified distance has been covered. If track magnets are used, their positions may additionally be determined by inductive means. In that case, a trackside equipment failure exists if no data message is received from a track magnet located by evaluating the inductive reaction on a vehicle magnet.

According to the present invention the two parallel-serial converters are implemented with components or circuits operating on different principles. This reduces the probability of an undetected component failure because, among other things, components of different kind, which cannot stem from the same production run, cannot have manufacturing imperfections of the same kind.

Further according to the present invention, it is possible to determine whether errors detected in the receiver are due to errors caused during transmission or to a component failure in the transmission facility.

In addition, there is provided separate data lines to an interlocking or central station. Thus, in addition to the fixed data contained in the input storage arrangements, variable data, such as signal aspects or speed recommendations, can be transmitted to the input storage arrangements.

BRIEF DESCRIPTION OF THE DRAWING

The above mentioned and other objects and features of the present invention and the manner of obtaining them will become more apparent by reference to the following description taken in conjunction with the drawing, the single FIGURE of which is a block diagram of a data-transmitting facility in accordance with the principles of the present invention.

DESCRIPTION OF THE PREFERRED EMBODIMENT

The FIGURE shows two input storage arrangements ES1 and ES2, in which the data to be transmitted are stored in two identical data records. These data records include data coded in fixed form, which indicate track features, for example, and variable data, which can be entered into arrangements ES1 and ES2 from an interlocking or central station via data links 14 and 15. Via the output 10 of a first parallel-serial converter PSW, which is a shift register, the data from the first input storage arrangement ES1 are transferred in serial form to a message transmitter TS, which delivers a frequency F1, modulated with the data, via an output A to an antenna (not shown) suitable for radiating this frequency, e.g., to a track magnet.

The clock for the transmission facility is generated by a clock generator T, which begins to provide clock pulses on application of a start signal to its input E. Via its output 1, generator T supplies clock pulses to the parallel-serial converter PSW and to all other components operating synchronously with the message output.

With the aid of counter chains Z1 and Z2, the first of which, Z1, operates as a bit counter, while the second, Z2 operates as a word counter, and a following control logic SL, the data-message format is determined with respect to bit number and word structure. A word decoder WD connected between the word counter Z2 and the control logic SL determines the positions of a header word and a check word which indicate, respectively, the beginning and the end of a data message.

The facility shown in the FIGURE contains an additional parallel-serial converter which works on a principle different from that of the first parallel-serial converter PSW. It converts the data from the second input storage arrangement ES2 into a serial data stream and is formed by a data selector DS (multiplexer). The data delivered by the data selector DS in serial form via an output 11 is fed to a feedback shift register RS for forming a redundant word characteristic of each data message. Via an output 13, the redundant word is delivered to the message transmitter TS subsequently to the data from the first parallel-serial converter PSW and, together with two nonequivalent bits, forms a check word for the previously transmitted data, which is thus protected with a Hamming distance of H=4. The nonequivalent bits come from a non-equivalence detector AD, to which the data provided by the first parallel-serial converter PSW and by the data selector DS are fed for comparison. The nonequivalence detector AD detects nonpermissible nonequivalences between the data and delivers the result in the form of two nonequivalent bits to the shift register RS, where these bits must pass through all stages before being delivered to the message transmitter TS.

Since the two bits must remain nonequivalent if all components operate correctly, these two bits can be used in the data receiver to check for component failures in the nonequivalence detector AD, the feedback shift register RS or the message transmitter TS. Errors in data processing are detected by means of the redundant part of the check word, which does not match the data message in the event of an error.

The operation of the transmission facility according to the invention can be explained with the aid of the following example of application. The data-transmitting portion of the facility according to the present invention and shown in the FIGURE is mounted as a trackside equipment in the immediate vicinity of a railway track, the transmitting antenna being a track magnet comprising two coils wound on a ferrite rod and tuned to a frequency F1 and a considerably lower frequency F2, respectively. The vehicles equipped for data reception carry equipment for receiving and evaluating the data messages to be transmitted, and a transmitter for producing an electromagnetic field oscillating at the lower frequency F2.

The coil tuned to the frequency F2 then acts like the secondary of a transformer and provides an alternating voltage of frequency F2 when approached by a vehicle having its transmitter turned on. This induced alternating voltage is interpreted as an indication of the presence of a vehicle. A threshold switch (not shown) then turns the clock generator T on or off, depending on the level of the induced voltage. If the trackside equipment is located far away from a power supply line, its entire energy requirement can be transferred from the vehicle by induction. To this end, the induced alternating voltage is rectified and limited to a predetermined value. It is then available as a supply voltage.

To monitor the trackside equipment for failures if track magnets are used, the reaction on the on-board transmitting antenna can be evaluated by the techniue used in an inductive signaling system. If a track magnet is located in this manner, and no data message is received at the same time, the track magnet is considered faulty, and the vehicle must travel the distance to the next, correctly operating track magnet with the help of another signaling system or at greatly reduced speed.

While I have described above the principles of my invention in connection with specific apparatus, it is to be clearly understood that this description is made only by way of example and not as a limitation to the scope of my invention as set forth in the objects thereof and in the accompanying claims.

I claim:

1. A facility for fail-safe data transmission between trackside equipment of a guideway and vehicles moving along said guideway comprising:
   data transmitting equipment in said trackside equipment to transmit data to said vehicle in the form of serial bit data messages protected against errors by means of a cyclic code using a redundancy technique, said transmitting equipment including
   two independent storage arrangements each having identical data stored therein;
   a message transmitter to transmit data to said vehicle;
   a first parallel-serial converter coupling one of said two storage arrangements to said message transmitter;
   a second parallel-serial converter coupled to the other of said two storage arrangements;
   a feedback shift register coupled between said second parallel-serial converter and said message transmitter; and
   means coupled to said first converter and said shift register to time the delivery of data to said message transmitter from said first converter and said shift register to provide a data message for transmission to said vehicle having an information portion provided by said first converter and a redundant portion provided by said shift register.

2. A facility according to claim 1, wherein said first and second converters are each implemented by a different circuit arrangement.

3. A facility according to claims 1 or 2, wherein said transmitting equipment further includes
   a data comparator coupled to said first and second converters and said shift register to compare data from said first and second converters bit by bit and to detect and store any disagreement, the results of said comparison being coupled to said shift register for coupling to said message transmitter along with said redundant portion.

4. A facility according to claim 3, further including
   two separate data links each coupled to a different one of said two storage arrangements and to a control center to enable entry of variable data into each of said first and second converters.

5. A facility according to claims 1 or 2, further including
   two separate data links each coupled to a different one of said two storage arrangements and to a control center to enable entry of variable data into each of said first and second converters.

* * * * *